Nov. 22, 1927.　　　　　　　　　　　　　　　　　1,649,985
G. J. SCHWEIZER
AUTOMOBILE WINDSHIELD SCREEN
Filed Nov. 4, 1926
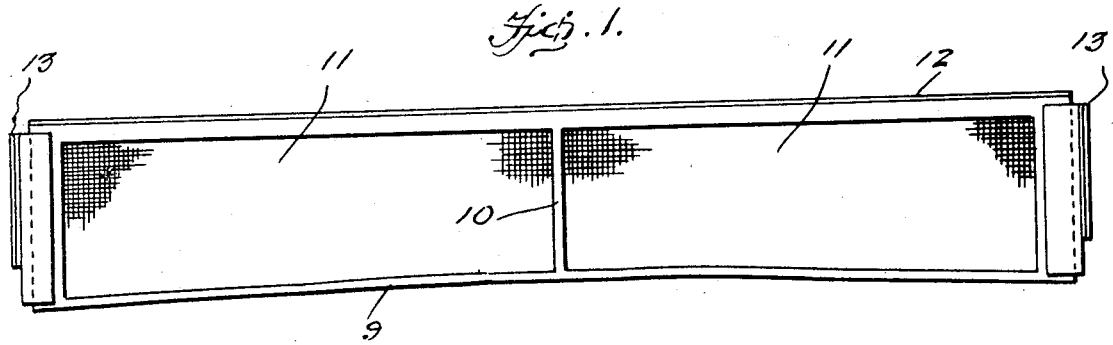
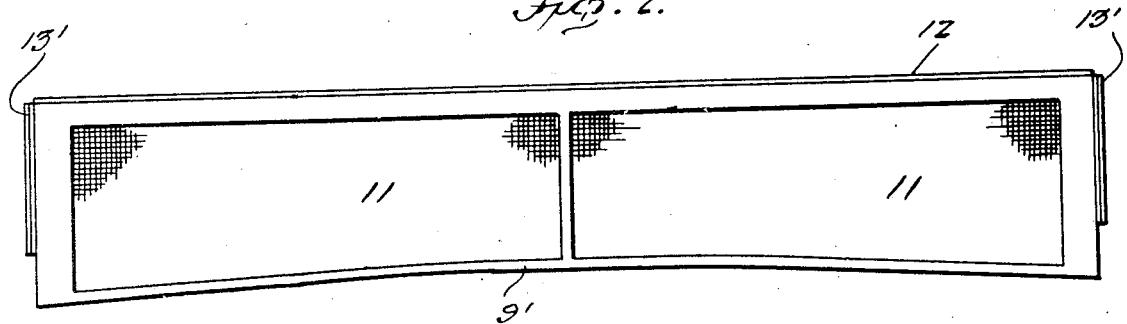
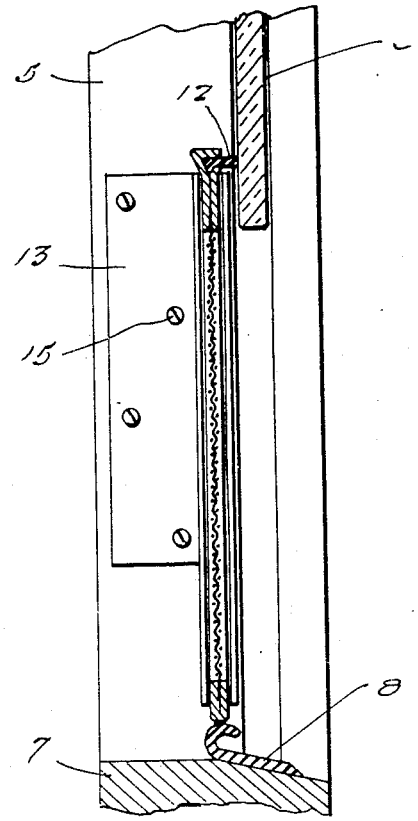
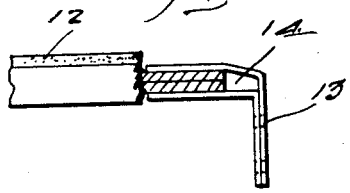
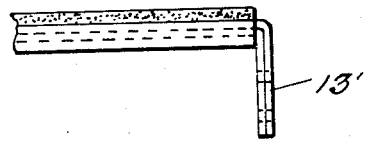
Inventor
George J. Schweizer
By Clarence A. O'Brien
Attorney Patented Nov. 22, 1927.

1,649,985

UNITED STATES PATENT OFFICE.

GEORGE J. SCHWEIZER, OF GREENVILLE, MISSISSIPPI.

AUTOMOBILE WINDSHIELD SCREEN.

Application filed November 4, 1926. Serial No. 146,197.

This invention relates to screen devices, and has more particular reference to a screen for automobile windshields and particularly those in the closed type automobiles.

The primary object of the invention resides in the provision of a screen construction that may be readily disposed between the vertical bars of a windshield frame at the inner side of the windshield so as to permit the windshield to be raised without the accompanying entrance of bugs, dirt and the like which is very annoying, frequently making it a necessity for the operator of the car to entirely close the windshield.

A further and important object is to provide a screen of this character that may be readily secured in proper position and that is of such a nature as not to materially detract from the appearance of the car, and without interfering with the raising or lowering of the automobile windshield.

In the drawing wherein there is disclosed two forms of windshield screen construction, particularly adapted for use in conjunction with the windshield of the Fisher VV type, Figure 1 is an inside elevation of the screen arranged upon the opposite ends of which are brackets for attachment to the vertical bars of the windshield frame, said brackets being so constructed as to permit the screen to be readily applied or removed.

Figure 2 is a view similar to Figure 1, in this instance however the brackets being formed rigidly at the ends of the frame so that the screen may be permanently attached within the windshield frame.

Figure 3 is a somewhat enlarged vertical section through the screen as actually installed within the windshield frame, the same being disclosed as mounted within the separate brackets.

Figure 4 is a fragmentary plan of one end of the screen that is removably supported with brackets rigidly anchored to the vertical bars of the windshield frame, and Figure 5 is a similar view of the screen that is constructed at its opposite ends with integral means whereby the screen may be permanently secured within the windshield frame.

Now having particular reference to the drawing, 5 in Figure 3 represents one of the vertical bars of a windshield frame in the type of automobile body previously mentioned vertically slidable between which is the usual windshield pane 6, and upon the sill 7 of which is the usual rubber rain strip 8. In the form of the invention disclosed in Figures 1, 3 and 4, the novel screen consists of a pressed metal frame 9 divided at its center by a cross strip 10, and within which frame at opposite sides of said cross strip are arranged panels 11—11 of wire mesh screening. The upper longitudinal edge of the frame 9 is so formed for receiving an outwardly directed packing strip 12 for wiping engagement at its inner longitudinal edge with the outer surface of the windshield pane 6 so as to provide a tight joint between the upper edge of the frame and said windshield pane.

In this form of the invention I provide a pair of brackets 13—13 of substantially L-shaped configuration as disclosed in Figure 4. Each bracket is preferably composed of two L-shaped plates, certain walls of which are joined together by spot welding or the like, while the other walls are separated to provide guide channels 14 for receiving the opposite edges of the screen frame 9. The joined walls of the plates comprising the brackets are formed with a plurality of openings so as to permit said walls to be rigidly secured to the vertical bars 5 of the windshield frame by screws or the like 15.

Obviously after the brackets 13—13 have been secured to the side bars of the vehicle windshield, the screen unit may be disposed within the windshield frame or as readily removed therefrom as the occasion arises.

In the form of the invention as disclosed in Figures 2 and 5, the construction of the screen is identically the same as that disclosed in the other figures, with the exception that in this form of the invention, the screen frame 9' is formed at its opposite ends with right angularly bent strips 13'—13', each of which is provided with a plurality of openings to permit these strips to be rigidly secured to the side bars of the windshield frame.

It will thus be seen that I have provided two forms of highly novel, simple, and efficient screens for closed body windshield, which are well adapted for all of the purposes heretofore designated, and even though I have herein shown and described said forms of the invention as consisting of certain detail structural elements, it is nevertheless to be understood that some changes may be made therein without effecting the spirit and scope of the appended claim.

Having thus described the invention, what I claim as new and desire to secure by Letters Patent is:—

In a screen for automobile windshields, a metallic frame, wire mesh screening material covering the frame, said frame adapted for disposition between the side bars of the windshield frame, a pair of guide brackets for the respective ends of the screen frame secured on the respective sides of the windshield frame, each of said brackets comprising a pair of substantially L-shaped plates, one pair of adjacent walls of each of the L-shaped plates being secured together and secured to the respective sides of the windshield frame, the other walls of each pair of complementary L-shaped plates being disposed in spaced relation to provide vertically extending guide channels, the ends of the screen frame being slidable within said channels.

In testimony whereof I affix my signature.

GEORGE J. SCHWEIZER.